Dec. 24, 1946.  W. M. BROWN  2,413,212
TORSION ROD SPRING SUSPENSION
Filed March 6, 1944  3 Sheets-Sheet 1

INVENTOR:
Wallace M. Brown
BY
atty.

Dec. 24, 1946.  W. M. BROWN  2,413,212
TORSION ROD SPRING SUSPENSION
Filed March 6, 1944  3 Sheets-Sheet 2

INVENTOR:
Wallace M. Brown

Patented Dec. 24, 1946

2,413,212

UNITED STATES PATENT OFFICE 2,413,212

TORSION ROD SPRING SUSPENSION

Wallace M. Brown, Seattle, Wash., assignor to Kenworth Motor Truck Corporation, Seattle, Wash., a corporation of Washington Application March 6, 1944, Serial No. 525,281

7 Claims. (Cl. 280—115)

This invention relates to steerable trailer-vehicles, or which is to say that character of trailer providing a load-sustaining body supported at the back by the rear-end running wheels and sustained at the front upon a wheeled truck, and with a fifth-wheel assembly being employed between the frame of the body and the sub-frame of the truck to permit the truck to swing bodily in relation to the trailer body about a central vertical axis. Generally stated, the invention aims to engineer torsion-rod mechanism into a vehicle of this nature as the means for springing the steerable sub-frame from its running wheels, accomplishing as the principal advantage a very appreciable reduction in the weight of the said truck as compared with the cumbersome leaf or compression spring suspensions which have been heretofore employed for the purpose.

It is a further and important object to apply a spring suspension of this nature and for the described purpose so designed as to assure the maximum degree of flexibility commensurate with sprung load and which, in more particularity, is attained by engineering the suspension in such a manner as to enable a torsion rod to be anchored at one of its ends to the frame of the steerable truck and yet be projected in a longitudinal direction well beyond the end limit of the frame, thus permitting the truck frame to be given a comparatively short fore-and-aft span without introducing any corresponding restriction in point of rod length.

As a still further and important object, the invention aims to provide a torsion-spring arrangement introducing some of the features found in the torsion-rod suspension which are illustrated and described in U. S. Pat. No. 2,333,008, issued jointly to myself and John G. Holmstrom October 26, 1943—namely the features of a lever journaled for rocker movements about an axis fixed in relation to the frame and connected by shackle links to the wheel for receiving responsive rocking movements as the wheel moves vertically in relation to the frame—and which, while it is essentially distinguished therefrom in that the one end of the torsion-rod is anchored to the frame rather than being given the full-floating mounting characterizing the disclosure of said patent, accomplishes one of the important ends attributed to the full-floating arrangement, that of positively maintaining the frame-anchored end of the torsion rod in exact axial alignment with the established axis on which the other and movable end of the rod performs its rotational wind-up, in consequence freeing the rod from the destructive influences of stresses deflecting the rod from its torsional axis.

The foregoing, with still further objects and advantages, will appear and be understood in the course of the following description and claims, the invention consisting in the novel construction and in the adaptation and combination of parts fully described in the following specification, illustrated in the accompanying drawings, and finally set forth in the appended claims.

In said drawings:

Figure 1 is a fragmentary horizontal sectional view on line 1—1 of Fig. 4 to illustrate a steerable truck of a trailer-vehicle embodying a spring suspension constructed in accordance with the preferred embodiment of the present invention, the section, more especially, being taken through the fifth-wheel assembly, and the underlying frame of the truck, its running wheels, and the spring suspension being shown in plan.

Figure 1:
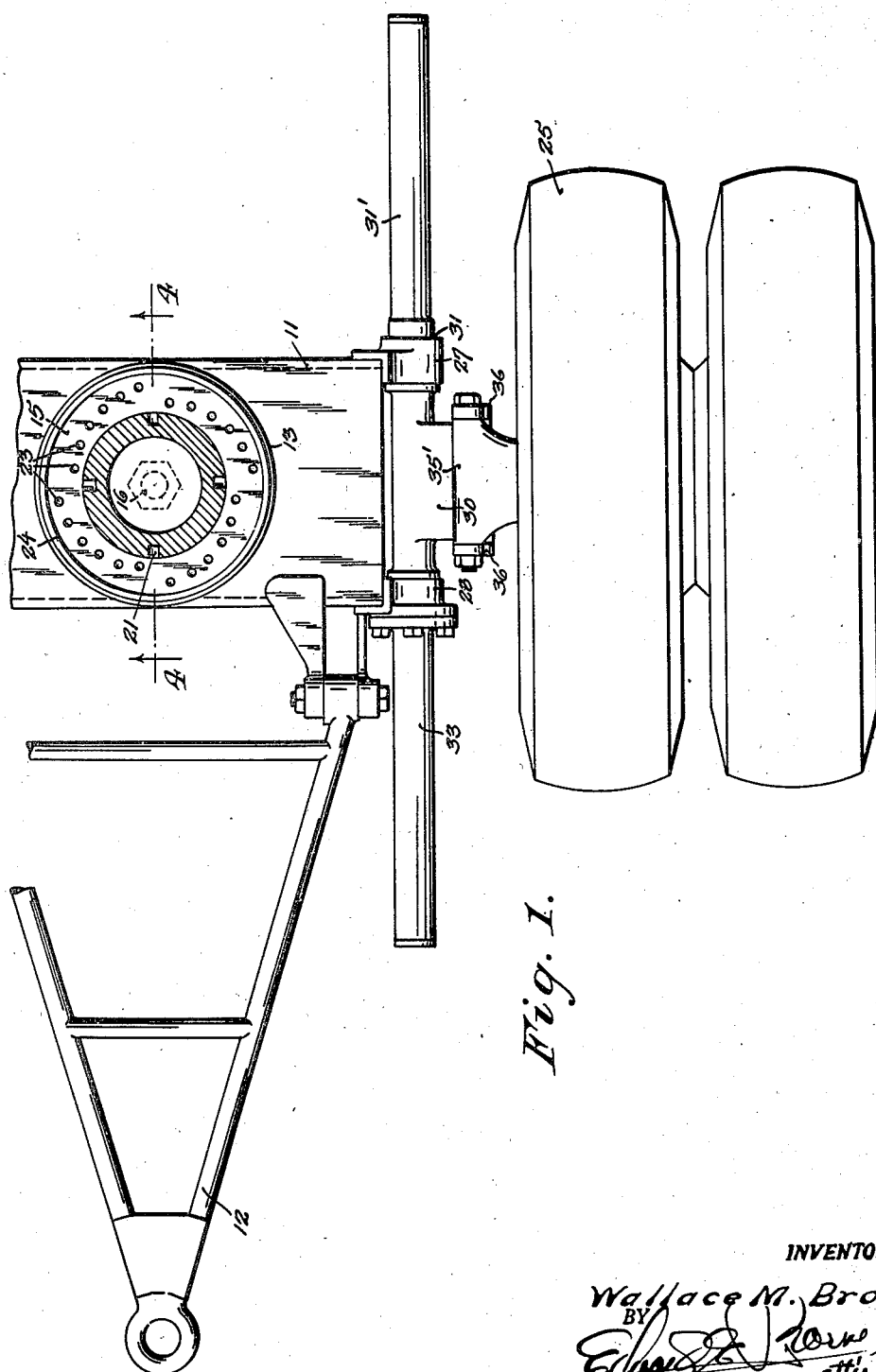
Figure 3:
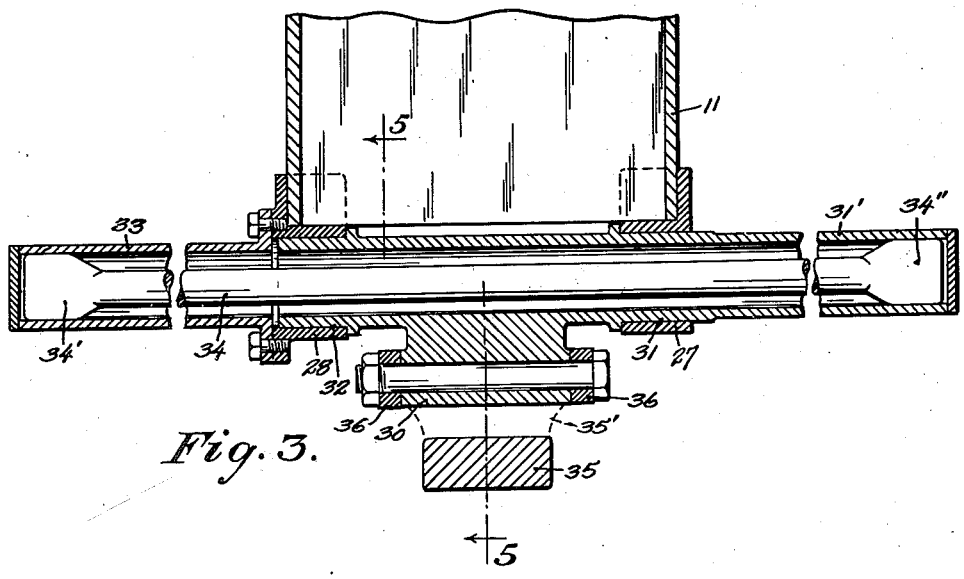
Fig. 3 is a fragmentary horizontal sectional view taken to an enlarged scale on line 3—3 of Fig. 2.
Figure 2:
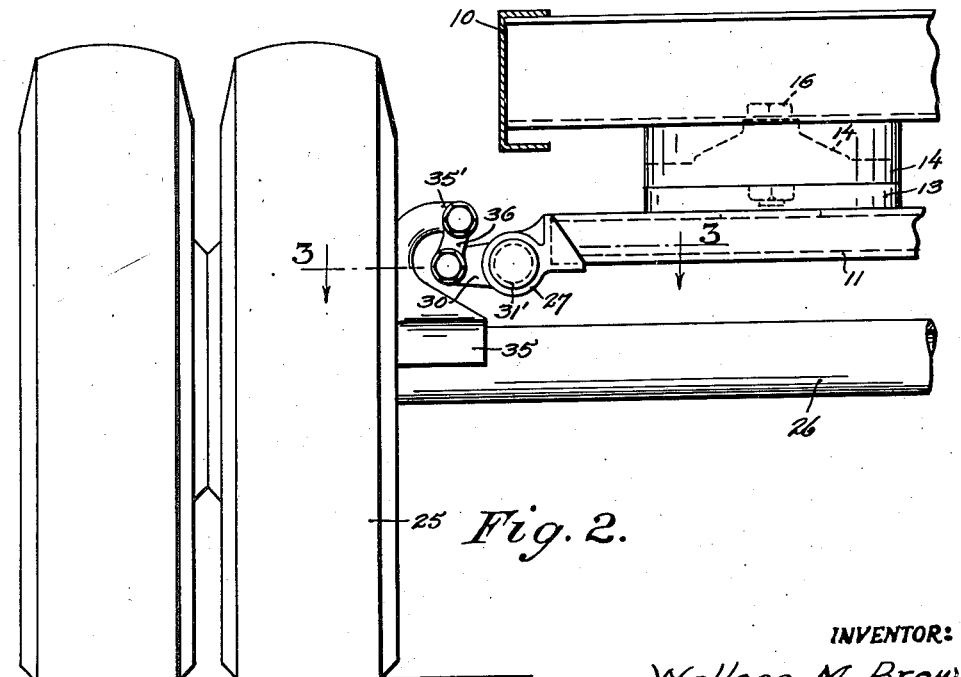
Fig. 2 is a transverse vertical section taken through the frame of the trailer's load-carrying body at a point behind the steerable truck, showing the latter in rear elevation.
Figure 5:
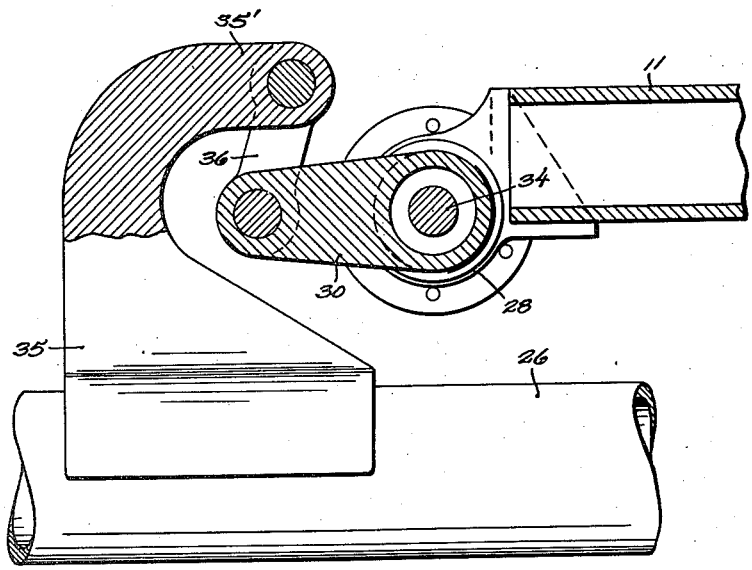
Fig. 5 is a fragmentary transverse vertical section taken to an enlarged scale on line 5—5 of Fig. 3.
Figure 4:
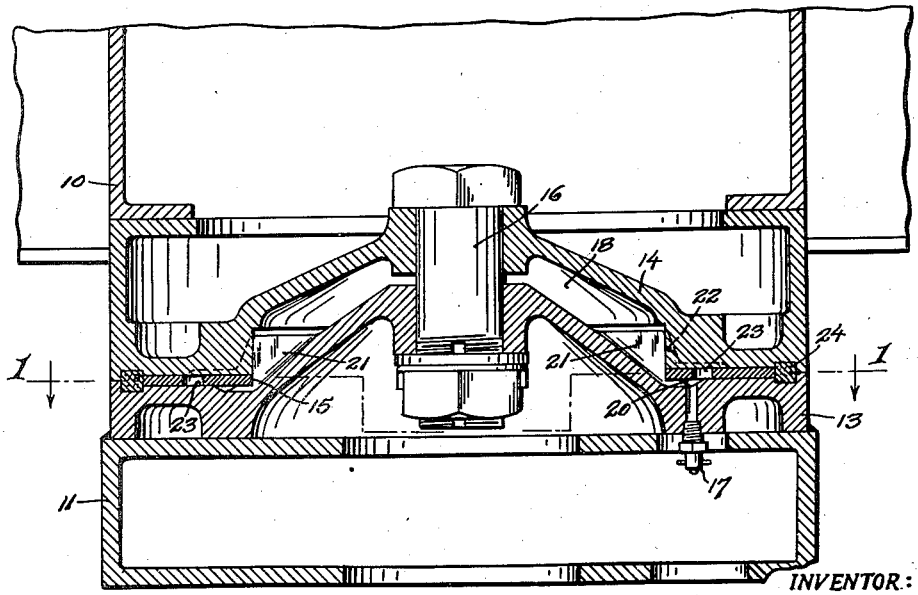
Fig. 4 is a still further enlarged longitudinal vertical section on line 4—4 of Fig. 1 to detail the fifth-wheel assembly.

Referring to said drawings, the numeral 10 denotes the load-carrying main frame of a steerable trailer-vehicle employing, at the front end, a sustaining wheeled truck equipped with the usual draw-bar 12. The frame 11 of this truck, in the performance of its steering function, connects by a vertical pivot with said body 10 to admit of bodily swinging movement about a central axis, and the arrangement which I have elected to illustrate as a suitable fifth-wheel assembly accommodating such swinging movement is comprised of ring members 13 and 14, superposed with an intervening steel washer 15 therebetween, one upon the other and which are fixed by welding or as may be otherwise desired one to the frame of the truck and the other to the frame of the body. Indicated at 16 is a king-bolt received through registering center-bores of said fifth-wheel complements.

There is provided, between the two said members 13 and 14 and in surrounding relation to the king-bolt, a grease reservoir 18 serviced from a pressure-gun fitting 17, the grease being forced into an annular manifold channel 20 exposed to the lower face of the washer and carried therefrom through radial slots 21 cut in the upper surface of the lower member 13 into the reservoir, thence feeding back to the upper face of the washer through radial slots 22 cut in the under surface of the upper member 14. Piercing the washer and acting to perform a grease-distributing office are multiple series of grease-pits 23 arranged, for each series, in an involute pattern. 24 denotes an annular packing ring received in opposing grooves formed about the perimeter of the two members 13 and 14 to lie outside the rim of the bearing washer.

The running wheels for the front end of the trailer and which occupy positions one upon one side and the other upon the other side of the truck are designated by 25 and receive a free-running journal upon the opposite ends of a through-axle 26 which extends transversely of the truck below the frame 11, and in now proceeding to describe my system of springing the frame from these wheels it becomes necessary to consider only one side of the truck as the spring suspension is alike for both sides and, other than as an oscillatory movement of one end of the axle transmits a modified movement to the other end, the actions are entirely independent.

It will be seen that I provide a pair of bearings 27 and 28 and secure the same in longitudinally spaced and co-axial relation upon the side of the frame 11, one being placed by preference slightly to the front and the other slightly to the rear of the transverse vertical plane occupied by the axle. A lever 30 is introduced in the space between these bearings, and provided by such lever is a center-bored hub which is prolonged axially in both directions to present journals 31 and 32 arranged to extend into and receive a rocker mounting from the bearings 27 and 28. Further characterizing the hub is a tubular extension projected axially from one of the journals beyond the related bearing, and this tube, designated by 31', may be given any desired length.

Giving the appearance of being a counterpart of such tube 31' and projecting in an axial direction from the opposite end of the lever-and-bearing assembly is a tube 33 which, however, is bolted or otherwise fixedly secured at its inner end to the related bearing 28 and thus is held stationary as distinguished from the permitted movement of the tube 31', namely a wrist movement as the same rocks in unison with the journaled hub of the lever. I apply my torsion rod, as 34, through the registering bores of the said hub and the two tubes, and suitably couple one end 34' to the outer end of the frame-anchored tube 33 while coupling the other end 34" to the outer extremity of the hub's prolongation 31'. Relative to these said tubes 31' and 33, either or both may, if desired, be themselves capable of a torsional wind-up and by such token permit the rod proper and, perforce, the over-all length of the entire assembly, to be correspondingly shortened for a given flexibility characteristic.

Represented at 35 is a perch fixedly mounted upon the axle 26 in proximate relation to the wheel and which, preferably, presents a terminal bill 35' overhanging the free end of the lever 30, links 36 being applied from this bill to the lever as a shackling connection.

The operation is believed to be clear from the foregoing, movement of the perch vertically in relation to the truck frame 11 imparting wrist movement to the lever and, through the tubular prolongation 31', twisting the connecting end 34" of the torsion rod 34. The other end 34' of the rod being held against rotation by means of the frame-anchored tube 33 causes a torsional wind-up, and places a spring load upon the lever yieldingly resisting its movement. The manner in which the rod end 34', and which to all intents and purposes can be considered as anchored to the frame itself, is held at all times in axial coincidence with the other and movable end 34" is thought to be apparent, and it is believed similarly clear that the described arrangement permits the torsion-rod to be given a length projecting itself in both directions well beyond the fore-and-aft limits of the truck frame without the need of resorting to bracing struts or the like as the means for anchoring the rod end 34' and which, perforce, would of necessity add considerable weight to the framing of the truck.

It will be understood that no limitations are to be implied by reason of having illustrated and particularly described a structural assembly which I now consider to be my preferred embodiment, and various departures may be resorted to without departing from the spirit of the invention.

What I claim is:

1. In a steerable trailer providing a load-carrying body, having a steering sub-frame of comparatively short fore-and-aft dimension at the front end thereof, and embodying a fifth-wheel assembly between sub-frame and body to permit the sub-frame to swing bodily in relation to the body for performing its steering office, the new suspension mechanism applied at each side of the sub-frame for springing the sub-frame from the running wheels therefor and comprising, in combination with the sub-frame and its running wheels: a lever carried by the sub-frame for rocker movements about an axis relatively fixed with respect to the frame and generally longitudinal as regards the latter; connection from the wheel to the lever functioning by vertical movements of the wheel to impart wrist movements to the lever; a torsion rod anchored at one end to the lever and extending therefrom along the axial line of the lever to have its opposite end project well beyond the end limit of the sub-frame; and a tube bolted to the sub-frame and extending longitudinally in axial coincidence with the lever from the sub-frame to the projected end of said torsion rod and having connection at its outer end with the latter to place a rotation-resisting load upon said projected end originating in the sub-frame.

2. In a steerable trailer providing a load-carrying body, having a steering sub-frame of comparatively short fore-and-aft dimension at the front end thereof, and embodying a fifth-wheel assembly between sub-frame and body to permit the sub-frame to swing bodily in relation to the trailer body for performing its steering office, the new suspension mechanism applied at each side of the sub-frame for springing the sub-frame from the related running wheel and comprising, in combination with the steering sub-frame and its running wheel: a pair of longitudinally spaced and aligned bearings rigidly carried by the sub-frame to occupy positions in the approximate vertical plane of the running wheel; a lever received in the space between said bearings presenting a center-bored hub having external journals at each end seating in the bearings and providing an elongated tubular extension projecting in an axial direction and as a prolongation of the hub well beyond one fore-and-aft limit of the sub-frame; a tube fixed to the other bearing and extending axially therefrom in a direction opposite to that of the hub's tubular extension well beyond the other fore-and-aft limit of the sub-frame; a torsion rod received through the center-bores of the hub and said tubular extensions and anchored by one of its ends to the outer end of the bearing-fixed extension and by the other of its ends to the outer end of the hub extension; and connection from the running wheel to said lever functioning by vertical movements of the wheel and against the spring-loading restraint imposed by the torsion rod to impart wrist movements to the lever.

3. Suspension mechanism for springing a vehicle frame from a running wheel therefor and comprising, in combination with the frame and its wheel: a pair of horizontally spaced and aligned bearings fixed to the frame; a lever working in the space between said bearings and having its hub prolonged axially from both ends to extend into and receive a journal from the bearings; a torsion spring having an anchoring connection from one of its ends to one of the bearings and fixed by its opposite end to the hub of the lever; and connection from the wheel to the lever functioning by vertical movements of the wheel to impart restrained wrist movements to the lever against the resisting load of the torsion spring, said hub and its axial prolongations being center-bored and having one of said axial prolongations carried outwardly well beyond the end limit of the related bearing, the mechanism providing, as a counterpart thereof of the axial prolongation last mentioned, a tube projecting in the opposite direction well beyond the end limit of the other bearing and as an axial prolongation of the latter, the spring being comprised of an elongated torsion rod received through the registering bores of the hub and the bearing extension and connecting by one end with the outer end of said tubular extension of the bearing and by its other end with the outer end of the projected prolongation of the hub.

4. The new system for torsion-springing a vehicle frame from its running wheel, and such as will permit a comparatively short frame-mounting for the spring system, comprising a pair of axially aligned hollow bearings carried in proximate but spaced relation by the frame; a lever disposed to occupy a position between the bearings and having a center-bored hub receiving a journal by its ends from the two bearings, said hub being provided with a tubular element extending outwardly from one end thereof and as an axial prolongation of the hub beyond a related said bearing; a tube fixed to the other bearing and extending outwardly in an opposite direction and in axial registration with the first said tubular element beyond the latter bearing; a torsion spring received through the center-bores of the hub and said tubular extensions and anchored by one of its ends to the outer end of said bearing-fixed extension and by the other of its ends to the outer end of the hub extension; and connection from the running wheel to said lever functioning by vertical movements of the wheel and against the spring-loading restraint imposed by the torsion spring to impart wrist movements to the lever.

5. The new system for torsion-springing a vehicle frame from its running wheel, and such as will permit a comparatively short frame-mounting for the spring system, comprising a pair of axially aligned bearings carried in proximate but spaced relation by the frame; a lever disposed to occupy a position between the bearings and having a center-bored hub receiving a journal by its ends from the two bearings, said hub being provided with a tubular element extending outwardly from one end thereof and as an axial prolongation of the hub beyond a related said bearing; torsion-spring mechanism received in the center-bore of the hub and its prolongation and attached by one of its ends to the end extremity of the prolongation and by its other end to the bearing which lies at the side of the lever remote from said prolongation; and connection from the wheel to said lever functioning by vertical movements of the wheel and against the spring-loading restraint imposed by the torsion spring to impart wrist movements to the lever.

6. The new system for torsion-springing a vehicle frame from its running wheel, and such as will permit a comparatively short frame-mounting for the spring system, comprising a lever having a center-bored hub supported by its ends from the frame for rocker movements about an axis relatively fixed with respect to the frame and generally longitudinal as regards the latter, and provided with a tubular element extending outwardly from one end of the hub as an axial prolongation of the latter; a tube bolted by its inner end to the frame and extending in approximate axial coincidence with the hub and as a prolongation of the frame longitudinally beyond the other end of the hub; torsion-spring mechanism received in said center-bore of the hub, the hub's tubular prolongation, and the prolongation of the frame and attached by one of its ends to the outer end of one said prolongation and by the other of its ends to the outer end of the other said prolongation; and connection from the wheel to said lever functioning by vertical movements of the wheel and against the spring-loading restraint imposed by the torsion spring to impart wrist movements to the lever.

7. The new system for torsion-springing a vehicle frame from its running wheel, and such as will permit a comparatively short frame-mounting for the spring system, comprising a lever having a center-bored hub supported by its ends from the frame for rocker movements about an axis relatively fixed with respect to the frame and generally longitudinal as regards the latter; a tube bolted by its inner end to the frame and extending in approximate axial coincidence with the hub and as a prolongation of the frame longitudinally beyond an end limit of the hub; torsion-spring mechanism received in said tube and also extending into the center-bore of the hub and attached by one of its ends to the outer end of the tube and by its other end to the lever at the side of the latter remote from said tube; and connection from the wheel to said lever functioning by vertical movements of the wheel and against the spring-loading restraint imposed by the torsion spring to impart wrist movements to the lever.

WALLACE M. BROWN.